May 29, 1928.  
J. ST. C. WERNIG  
1,671,174  
AUTOMOBILE BUMPER AND SUPPORTING MEANS THEREFOR  
Filed April 15, 1927
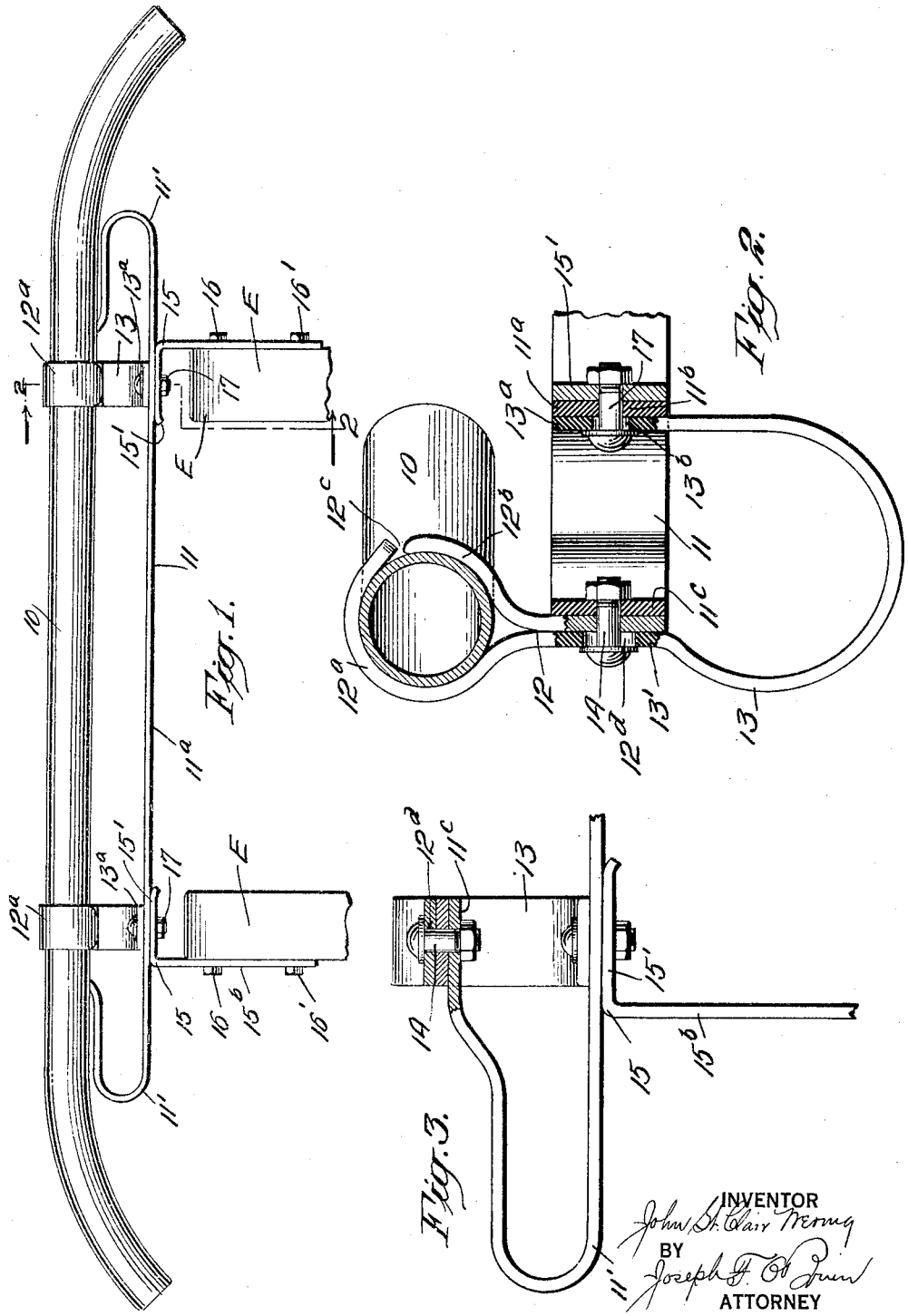

Patented May 29, 1928.

1,671,174

UNITED STATES PATENT OFFICE.

JOHN ST. CLAIR WERNIG, OF BROOKLYN, NEW YORK.

AUTOMOBILE BUMPER AND SUPPORTING MEANS THEREFOR.

Application filed April 15, 1927. Serial No. 183,983.

This invention relates to improvements in automobile bumpers and supporting means therefor.

In one type of bumper heretofore made, tubular or rigid-bar impact members have been directly connected or bolted to the free horizontally looped ends of a horizontal supporting member in which case it is difficult if not impossible to mount the impact member in a satisfactorily elevated position, and because of the rigid connection of these free ends by the impact member a bumper is produced which while capable of satisfactorily absorbing heavy shocks is too rigid to absorb the usual light shocks frequently encountered in use.

In another type of bumper heretofore used the impact members have been supported in mountings at the free ends of vertically-disposed loops. While in this construction, the impact member is supported at the proper elevation, it is open to the objection that these vertically looped members are unstable, afford insufficient resistance to the heavier impacts and frequently permit one end of the bumper to sag below the other end.

One of the objects of the present invention is to provide in a bumper of the type specified, supporting means which will retain a rigid impact member of the tubular or bar type in true horizontal alignment; will prevent sagging, will retain or hold the bumper in properly elevated position, will provide an initial resilience sufficient to absorb light shocks satisfactorily while providing resilient resistance to greater shocks which increases rapidly in accordance with the intensity of the shock.

Another object of my invention is to produce a mounting for tubular or solid-bar impact members of the rigid type, by first providing a horizontally looped member having free ends and then resiliently reinforcing these free ends by a vertically looped member having free ends fastened to the free ends of the horizontal looped member, and also avoiding excessive rigidity by mounting the rigid impact member adjacent to and preferably above the joint thus produced.

Another object of the invention is to utilize in the supporting of this type of impact member a relatively rigid horizontally-disposed resilient or spring back bar extending across the chassis and having outwardly-disposed loops with free ends, combined, in its supporting function, with a vertically-disposed holder or mounting member extending transversely and above said horizontally-disposed member and having a vertical loop extending below said horizontal looped member, thus not only providing a holder above the horizontally-disposed member but resiliently reinforcing the free end of the horizontally-disposed member.

Another object is to produce a mounting having joint horizontally and vertically looped supporting members which will be ornamental, sightly and which may be readily and easily attached to the car chassis as a single unit, this preferably being accomplished by having the vertical member carried by the horizontal member.

Another object of the invention is to provide a device of the character specified with an impact holder by which such impact member may be quickly demountable.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which:—

Fig. 1 is a plan view of a bumper embodying my invention;

Fig. 2 is a section on the line 2—2 of Fig. 1; and

Fig. 3 is a fragmentary horizontal section taken between the impact member and the horizontal supporting member.

Referring now to these drawings, which illustrate a preferred embodiment of my invention, 10 indicates an impact member of an automobile bumper which, in the preferred embodiment shown, comprises a round bar or tube closed at its ends and of a length adapted to extend transversely across the chassis at the front or rear end of an automobile. This impact member may be of any desired shape or configuration and is supported above the free outer ends $11^e$ of horizontally-disposed loops $11'$, $11'$ which are preferably formed integrally at the opposite ends of a connecting base-bar portion $11^a$ to produce the complete looped bar or member 11.

The free outer ends 11ᶜ of the loops 11' are unconnected directly with the rigid impact member, but are connected to said rigid impact member through mountings supported by said horizontal looped member, thus having extending upwardly therefrom a mounting 12 for said impact member. This is my preferred form of mounting and, as illustrated, comprises segmental arcuate members 12ᵃ, 12ᵇ forming a split seat for the impact member 10, said seat having an opening at 12ᶜ.

The free end portions 11ᶜ of the horizontal loop are thus unconnected except through the said mounting and the elevated impact bar 10.

Said free ends 11ᶜ are also preferably reinforced and connected to the base-bar 11ᵃ by vertically-disposed loops 13, each of which is preferably formed integrally with one of the mounting members 12ᵃ, 12ᵇ at its outer end 13' and has its inner end 13ᵃ supported by the connecting base-bar portion of the horizontally-disposed supporting member 11. It will thus be seen that the otherwise free ends 11ᶜ of the horizontal member are joined or connected to the base-bar portion. I thus provide sufficient rigidity to avoid excessive downward pressure on such free ends which would normally cause a torsional strain thereon and furthermore provide vertical reinforcing and supporting loops for the said free ends. This vertical loop combined with the horizontal looped member will avoid the excessive rigidity which would occur by a direct connection of the rigid impact member with the free ends of the horizontal loop, but on the contrary, takes advantage of the normal resilience of such free ends and combines the same, at an intermediate portion, with what in effect comprises another free-end vertically-looped mounting member, thus providing a support which will have great initial resilience so as to absorb or take up shocks of light intensity in a more effective manner than would be the case if the rigid impact member were directly connected to the horizontally-looped member, but will possess greater rigidity than if said impact member were supported alone by the vertically-looped member. This combination of the vertical supporting loop and the horizontal supporting loop will, therefore, produce a mutually reinforced resilient supporting structure which will prevent the sagging which usually accompanies the use of either one of these two elements, and at the same time will enable advantage to be taken of the reinforcing and shock resisting qualities of the horizontal looped member as well as the facility of mounting or attaching of the bumper to the chassis, while coupling the same with a desirable vertically-disposed looped mounting element for the impact member which extends above and below the plane of the horizontal member to properly elevate said impact member and to provide a leverage action about said horizontal free ends during the initial inward movement of the impact member under impact, but when a shock occurs sufficient to overcome this initial leverage action a coupling of the resilient resistance of said vertical and horizontal loops occurs so as to cause a rapid increase in such resistance after such initial movement.

I preferably provide an impact-mounting having a split seat composed of arcuate members which will greatly facilitate the mounting and demounting of the impact member.

The carrying or suspension of the vertically-looped member, by the horizontally-looped member, the opposite loops of which are preferably formed integrally as aforesaid with the attaching or connecting bar, also enables a facile connection of the bumper with the chassis of the car by the usual simple bracket and avoids the more difficult connection of such vertical loops to the top of the frame ends or horns of the automobile chassis, and permits the brackets to be fastened through the sides of such frame ends in the usual manner.

In the preferred embodiment of my invention shown, the mounting members 12ᵃ, 12ᵇ of the mounting 12 are fastened to the free ends 11ᶜ of the horizontal supporting member by a bolt 14 which passes through at the outer end 11ᶜ and said members 12ᵃ, 12ᵇ. The member 12ᵃ is provided with an elongated slot 12ᵈ through which the bolt passes so as to allow for the variations in the parts. The connection of the end 13ᵃ of the vertical loop 13 with the attaching or base-bar 11ᵃ and with the transverse portion 15' of the bracket 15 is accomplished by a single bolt 17 which also passes through an elongated hole 13ᵇ in the end 13ᵃ of the loop 13, through a hole 11ᵇ in the bar 11ᵃ and also through a hole 15ᵃ in said transverse portion 15' of the bracket 15. The bracket 15 which is of conventional type has, as shown, a longitudinally-extending portion 15ᵇ which is fastened at the sides of the frame ends or horns E by bolts 16, 16'.

Having described my invention, I claim:—

1. A bumper embodying an impact member and supporting elements for each end of said impact members, each embodying a horizontally-disposed loop having a free end, and a mounting member extending vertically above said horizontally-disposed loop at substantially right angles thereto for mounting said impact bar.

2. A bumper embodying an impact member and supporting elements for each end of said impact members, each embodying a horizontally-disposed loop having a free end, and a mounting member extending vertically above said horizontally-disposed loop at substantially right angles thereto for mounting said impact bar, said impact-mounting member comprising a pair of members cooperating to form a split mounting-seat, one of said pair being provided with a major portion of said split mounting-seat and the other having a minor portion of said seat.

3. An automobile bumper embodying a rigid impact member and a plurality of supporting elements at each end of said impact member, each embodying a horizontal loop provided with a free end and a vertical loop also having a free end and provided with an impact-member mounting at said free end, said two members being connected together adjacent to said mounting.

4. An automobile bumper embodying a rigid impact member and a plurality of supporting elements at each end of said impact member, one of said supporting elements comprising a horizontally-disposed loop connected at its inner end with the automobile chassis and free at its outer end and the other supporting element comprising a vertically-disposed looped member connected with the free end of said horizontally-disposed loop, said supporting element also being provided with an impact-member mounting adjacent to the free end of said horizontally disposed loop.

5. An automobile bumper embodying a rigid impact member and a plurality of supporting elements at each end of said impact member, one of said supporting elements comprising a horizontally-disposed loop connected at its inner end with the automobile chassis and free at its outer end and the other supporting element comprising a vertically-disposed looped member connected at its inner end to the inner end of the horizontally-disposed loop and at its outer end connected with the free end of said horizontally-disposed loop, said supporting element also being provided with an impact-member mounting adjacent to the free end of said horizontally-disposed loop.

6. An automobile bumper embodying a rigid impact member and a plurality of supporting elements at each end of said impact member, one of said supporting elements comprising a horizontally-disposed loop connected at its inner end with the automobile chassis and free at its outer end and the other supporting element comprising a vertically-disposed looped member connected with the free end of said horizontally-disposed loop, said supporting element being provided with an impact-member mounting adjacent to the free end of said horizontally-disposed loop, and said vertically-disposed loop having an integral portion forming a part of said mounting seat for the impact member.

7. An automobile bumper embodying a rigid impact member and a plurality of supporting elements at each end of said impact member, one of said supporting elements comprising a horizontally-disposed loop connected at its inner end with the automobile chassis and free at its outer end and the other supporting element comprising a vertically-disposed looped member connected with the free end of said horizontally-disposed loop, said mounting member being provided with an impact-member mounting adjacent to the free end of said horizontally-disposed loop, and said vertically-disposed loop having an integral portion forming a part of said mounting seat for the impact member, said mounting seat being composed of a pair of cooperating members each of which members is provided with a portion of a split mounting seat for the impact member.

8. An automobile bumper embodying a rigid impact member and a plurality of supporting elements at each end of said impact member, one of said supporting elements comprising a horizontally-disposed loop connected at its inner end with the automobile chassis and free at its outer end and the other supporting element comprising a vertically-disposed looped member connected with the free end of said horizontally-disposed loop, said supporting element being provided with an impact-member mounting adjacent to the free end of said horizontally-disposed loop, and said vertically-disposed loop having an integral portion forming a part of said mounting seat for the impact member, said mounting seat being composed of a pair of cooperating members, one of which members is provided with a major portion of a split mounting seat for the impact member and the other is formed to provide a minor portion of said seat.

9. An automobile bumper embodying a rigid impact member and a plurality of supporting elements at each end of said impact member, one of said supporting elements comprising a horizontally-disposed loop connected at its inner end with the automobile chassis and free at its outer end and the other supporting element comprising a vertically-disposed looped member connected with the free end of said horizontally-disposed loop, said mounting member being provided with an impact-member mounting adjacent to the free end of said horizontally-disposed loop, and said vertically-disposed loop having an integral portion forming a part of said mounting seat for the impact member, said mounting seat being composed of a pair of cooperating members, one of which members is provided with a major portion of a split mounting seat for the impact member and the other is formed to provide a minor portion of said seat, and one of said members being formed integrally with said vertically-disposed looped member, said cooperating seat-forming members extending vertically and having split seat portions abutting each other at their free ends and fastening means arranged intermediate the ends of said seat-forming member and at said free ends of the horizontal loop to clamp said impact member between the split-seat portions of said seat-forming members.

In witness whereof, I have signed my name to the foregoing specification.

JOHN ST. CLAIR WERNIG.